United States Patent
Lahetkangas et al.

(10) Patent No.: US 10,476,586 B2
(45) Date of Patent: Nov. 12, 2019

(54) SUB-FRAME CONFIGURATION IN CELLULAR SYSTEM

(71) Applicant: NOKIA SOLUTIONS AND NETWORKS OY, Espoo (FI)

(72) Inventors: Eeva Lahetkangas, Oulu (FI); Esa Tapani Tiirola, Kempele (FI); Kari Pekka Pajukoski, Oulu (FI); Kari Juhani Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/755,043

(22) PCT Filed: Nov. 2, 2015

(86) PCT No.: PCT/EP2015/075367
§ 371 (c)(1),
(2) Date: Feb. 23, 2018

(87) PCT Pub. No.: WO2017/032431
PCT Pub. Date: Mar. 2, 2017

(65) Prior Publication Data
US 2018/0249447 A1     Aug. 30, 2018

(30) Foreign Application Priority Data
Aug. 25, 2015 (WO) .................. PCT/EP2015/069426

(51) Int. Cl.
*H04B 7/26* (2006.01)
*H04W 72/04* (2009.01)
(Continued)

(52) U.S. Cl.
CPC ......... *H04B 7/2656* (2013.01); *H04L 5/0007* (2013.01); *H04L 5/0082* (2013.01);
(Continued)

(58) Field of Classification Search
CPC ... H04W 88/08; H04W 72/042; H04W 16/14; H04W 24/00; H04W 28/06; H04W 28/16
See application file for complete search history.

(56) References Cited

U.S. PATENT DOCUMENTS 8,027,295 B2 * 9/2011 Frederiksen .......... H04J 3/1682
370/310.2
2014/0086078 A1 3/2014 Malladi et al.
2014/0369221 A1 12/2014 Fu et al.

FOREIGN PATENT DOCUMENTS

EP   0983646 B1   6/2003
EP   2355605 A1   8/2011
(Continued)

OTHER PUBLICATIONS

International Search Report and Written Opinion for International Application No. PCT/EP2015/075367, dated Jul. 25, 2016 (17 pages).
(Continued)

*Primary Examiner* — Chandrahas B Patel
(74) *Attorney, Agent, or Firm* — Brake Hughes Bellermann LLP

(57) ABSTRACT

This document discloses a solution for configuring sub-frames in a cellular communication system. According to an aspect, a method comprises: allocating, in a network node of the cellular communication system, at least one set of available lengths for use in selection of a length of at least one of an uplink control part and a downlink control part of a sub-frame; selecting, in the network node, a length of at least one of the uplink control part and the downlink control part of the sub-frame, the length being selected amongst the at least one set of available lengths, the sub-frame comprising the uplink control part carrying at least one of uplink control information and an uplink reference signal and further comprising the downlink control part carrying at
(Continued)

least one of downlink control information and a downlink reference signal; and causing transmission of a message comprising at least one information element indicating the selected length of the at least one of uplink control part and downlink control part of the sub-frame.

18 Claims, 5 Drawing Sheets

(51) Int. Cl.
*H04W 72/12* (2009.01)
*H04L 5/00* (2006.01)

(52) U.S. Cl.
CPC ..... *H04W 72/042* (2013.01); *H04W 72/0446* (2013.01); *H04W 72/1205* (2013.01)

(56) References Cited

FOREIGN PATENT DOCUMENTS

| | | | |
|---|---|---|---|
| EP | 2373105 | A1 | 10/2011 |
| EP | 2787677 | A2 | 10/2014 |
| JP | 2010074471 | A | 4/2010 |
| JP | 2015133618 | A | 7/2015 |
| JP | 2015518667 | A | 7/2015 |
| WO | 9926460 | A1 | 5/1999 |
| WO | 2008084445 | A2 | 7/2008 |
| WO | 2011098844 | A1 | 8/2011 |
| WO | 2011099607 | A1 | 8/2011 |
| WO | 2013141515 | A1 | 9/2013 |
| WO | 2013162326 | A1 | 10/2013 |
| WO | 2014084638 | A1 | 6/2014 |
| WO | 2014117709 | A1 | 8/2014 |

OTHER PUBLICATIONS

Office Acton for Japanese Application No. 2018-510389, dated Jan. 25, 2019, 4 pages.
European Search Report for Application No. 18192879.7, dated Dec. 4, 2018, 8 pages.

* cited by examiner

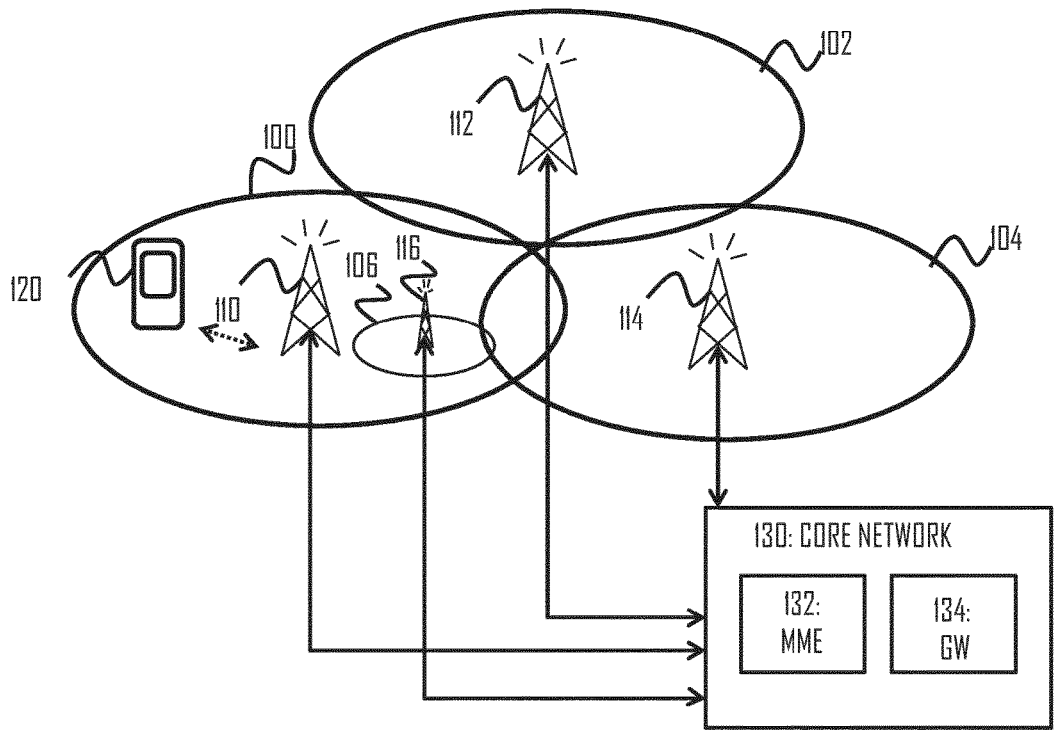
Fig 1
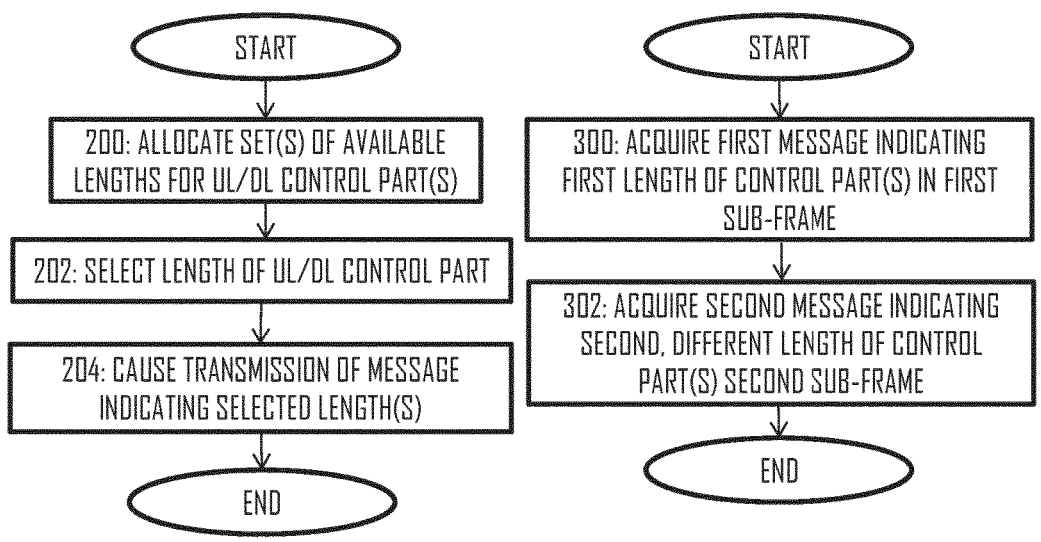
Fig 2
Fig 3

408: FIRST SUB-FRAME

418: SECOND SUB-FRAME

428: THIRD SUB-FRAME

508: DOWNLINK SUB-FRAME

518: DOWNLINK SUB-FRAME

528: UPLINK SUB-FRAME

538: UPLINK SUB-FRAME

SUB-FRAME CONFIGURATION IN CELLULAR SYSTEM

CROSS-REFERENCE TO RELATED APPLICATIONS

This application is a national stage entry of PCT Application No. PCT/EP2015/075367 filed Nov. 2, 2015, entitled "SUB-FRAME CONFIGURATION IN CELLULAR SYSTEM," which claims priority to PCT Application No. PCT/EP2015/069426 filed Aug. 25, 2015, entitled "RADIO FRAME CONFIGURATION," both of which are hereby incorporated by reference in their entirety. This application also claims priority to PCT Application No. PCT/EP2015/069426 filed Aug. 25, 2015, entitled "RADIO FRAME CONFIGURATION."

TECHNICAL FIELD

The invention relates to wireless communications in a cellular communication system and, in particular, sub-frame configurations in a cell.

BACKGROUND

The need for development of telecommunication is being driven by the increasing demand for mobile data and the emergence of the Internet of Things (IoT), through which even billions of devices will become connected. In the future, technologies, such as remote healthcare and advanced logistics, will require much shorter network response times to enable rapid reactions.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which FIG. 1 illustrates a wireless communication system to which embodiments of the invention may be applied;

FIG. 2 illustrates a process for configuring sub-frames according to an embodiment of the invention;

FIG. 3 illustrates a process for adapting to varying sub-frame configurations in a terminal device according to an embodiment of the invention;

DETAILED DESCRIPTION OF SOME EMBODIMENTS

Figure 4:
FIGS. 4 and 5 illustrate sub-frame configurations according to some embodiments of the invention.
Figure 4:
Figure 4:

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Universal Mobile Telecommunication System (UMTS, 3G) based on basic wideband-code division multiple access (W-CDMA), high-speed packet access (HSPA), Long Term Evolution (LTE), LTE-Advanced, and/or 5G system. The present embodiments are not, however, limited to these systems.

The embodiments are not, however, restricted to the system given as an example but a person skilled in the art may apply the solution to other communication systems provided with necessary properties. One example of a suitable communications system is the 5G system, as listed above. It is assumed that network architecture in 5G will be quite similar to that of the LTE-advanced. 5G is likely to use multiple input-multiple output (MIMO) antennas, many more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

FIG. 1 illustrates an example of a cellular communication system to which embodiments of the invention may be applied. Cellular radio communication networks, such as the Long Term Evolution (LTE), the LTE-Advanced (LTE-A) of the 3$^{rd}$ Generation Partnership Project (3GPP), or the predicted future 5G solutions, are typically composed of at least one network node, such as a network node 110, providing a cell 100. Each cell may be, e.g., a macro cell, a micro cell, femto, or a pico cell, for example. The network node 110 may be an evolved Node B (eNB) as in the LTE and LTE-A, or any other apparatus capable of controlling radio communication and managing radio resources within a cell. For 5G solutions, the implementation may be similar to LTE-A, as described above. The network node 110 may be called a base station or an access node. The cellular communication system may be composed of a radio access network of network nodes 110, 112, 114, e.g. eNBs, each controlling a respective cell or cells 100, 102, 104. The network nodes 110 to 114 may each control a macro cell 100 to 104 providing wide area coverage for terminal devices 120. The network nodes 110 to 114 may also be called access nodes because they provide the terminal devices 120 with wireless access to other networks such as the Internet. Additionally, one or more local area access nodes 116 may be arranged within a control area of a network node 110, 112, 114 controlling a macro cell, 100 to 104. The local area access node 116 may provide wireless access within a sub-cell 106 that may be comprised within a macro cell 100. Examples of the sub-cell may include a micro, pico and/or femto cell. Typically, the sub-cell provides a hot spot within a macro cell. The operation of the local area access node 116 may be controlled by a network node 110 under whose control area the sub-cell is provided. The network node 110 and the other network nodes 112 to 116 may support Dual Connectivity (DC) in which the terminal device 120 has established multiple radio resource control (RRC) connections with the radio access network comprising the network nodes 110 to 116. The terminal device 120 may establish one RRC connection with the network node 110 and another RRC connection with the local area access node 116 for improved performance of communications.

The network node 110 alone or together with the other network node 116 may employ carrier aggregation in which the terminal device 112 is allocated with resources from a plurality of component carriers that may be on contiguous frequency bands or on non-contiguous frequency bands. One network node 110 may provide one component carrier, e.g. a primary component carrier, while another network node 116 may provide another component carrier, e.g. a secondary component carrier. The network node 110 operating the primary component carrier may carry out scheduling of resources on all component carriers, or each network node 110, 116 may control scheduling of the component carrier it operates. Alternatively network node 110 may provide one component carrier, e.g. a primary component carrier, as well as another component carrier, e.g. a secondary component carrier.

In the case of multiple network nodes in the communication network, the network nodes may be connected to each other with an interface. LTE specifications call such an interface as X2 interface. Other communication methods between the network nodes may also be possible. The network nodes 110 to 116 may be further connected via another interface to a core network 130. The LTE specifications specify the core network as an evolved packet core (EPC), and the core network may comprise a mobility management entity (MME) 132 and a gateway node 134. The MME may handle mobility of terminal devices in a tracking area encompassing a plurality of cells and also handle signaling connections between the terminal devices and the core network 130. The gateway node 134 may handle data routing in the core network 130 and to/from the terminal devices.

The radio system of FIG. 1 may support Machine Type Communication (MTC). MTC may enable providing service for a large amount of MTC capable devices, such as the at least one terminal device 120. The at least one terminal device 120 may comprise mobile phones, smart phones, tablet computers, laptops and other devices used for user communication with the radio communication network, such as a MTC network. These devices may provide further functionality compared to the MTC scheme, such as communication link for voice, video and/or data transfer. However, in MTC perspective the at least one terminal device 120 may be understood as a MTC device. It needs to be understood that the at least one terminal device 120 may also comprise another MTC capable device, such as a sensor device providing position, acceleration and/or temperature information to name a few examples.

In MTC, the radio communication network may need to handle a massive amount of uncoordinated accesses by the MTC devices. As the amount of MTC devices may be quite high, network access may be a limiting factor, compared to the conventional network limitations, where interference and/or limited coverage may pose a problem. Most of the MTC devices may have a small amount of data to be transmitted in sporadic fashion. This may enable the MTC devices to spend majority of time in sleep mode, disconnected from the network node 110 to 116 and/or the cellular communication network. Thus, the MTC devices may have a requirement of very small energy small energy consumption.

FIGS. 2 and 3 illustrate processes for configuring frame transmissions in a cell of a cellular communication system, e.g. the cell 100 provided by a network node 110. FIG. 2 illustrates a process executed in the network node 110 controlling the cell 100, and FIG. 3 illustrates a process executed in a terminal device 120 located in the cell 100 and carrying out communication with the network node 110 in the cell 100.

Referring to FIG. 2, the process comprises in the network node 110: allocating (block 200) at least one set of available lengths for use in selection of a length of at least one of an uplink control part and a downlink control part of a sub-frame; selecting (block 202) a length of at least one of the uplink control part and the downlink control part of the sub-frame, the length being selected amongst the at least one set of available lengths, the sub-frame comprising the uplink control part carrying at least one of uplink control information and an uplink reference signal and further comprising the downlink control part carrying at least one of downlink control information and a downlink reference signal; and causing (block 204) transmission of a message comprising at least one information element indicating the selected length of the at least one of uplink control part and downlink control part of the sub-frame.

A reference signal may be used to estimate channel quality, and control information may carry signalling information, e.g. control or management messages.

Referring to FIG. 3, the process comprises in the terminal device 120: acquiring (block 300) a first message originated from a network node of the cellular communication system, the first message comprising at least one information element indicating a first length of an uplink control part or a downlink control part of a first sub-frame, wherein the first sub-frame comprises the uplink control part and the downlink control part of the first sub-frame; and acquiring (302) a second message originated from the network node, the second message comprising at least one information element indicating a second length of an uplink control part or a downlink control part of a second sub-frame, wherein the second sub-frame comprises the uplink control part and the downlink control part of the second sub-frame. The first length indicates the length of the control part of the same link direction as indicated by the second length, and wherein the second length is different from the first length.

The processes of FIGS. 2 and 3 enable the network node to adjust the length of the uplink control part and/or the length of the downlink control part of the sub-frame. The set of available lengths is defined in block 200. The adjustment may be carried out on the basis of one or more determined criteria of which some embodiments are described below. The capability of adjusting the length of the control part(s) enables adaptation to varying conditions, thus improving flexibility. For example, terminal devices on a cell edge may require more control signalling than terminal devices closer to a radio site of the network node. Such adaptive configuration of the lengths of the control part(s) enables also efficient communication from the viewpoint of the terminal device 120. In a poor radio environment, a longer control part may be used to improve reliability of the communication while a shorter control part may leave more room for data in a good radio environment.

In an embodiment, the total length of the sub-frame, sub-frames, or all sub-frames transmitted by the network node is fixed. Advantageously, the same sub-frame size may be employed for different cell sizes.

In an embodiment, the uplink control part encompasses all the uplink signalling information contained in the sub-frame and, in some embodiments, an uplink reference signal. Similarly, the downlink control part may encompass all the downlink signalling information contained in the sub-frame and, in some embodiments, a downlink reference signal. Accordingly, the selection of the length of the control part affects directly the amount of control information and/or reference signal information in the sub-frame.

The radio site may refer to a location of an antenna or an antenna array of the cell the network node controls.

FIG. 4 illustrates some embodiments of the sub-frames that may be transmitted by the network node 110 in the cell 100. As seen in FIG. 4, the lengths of an uplink part 404 and a downlink part 400 may be varied from sub-frame to another. In an embodiment, the downlink part 400 precedes the uplink part 404, and a guard interval 402 may be provided between the downlink part 400 and the uplink part 404 in the sub-frame. In an embodiment, no dedicated guard period is provided at the end and/or at the beginning of the sub-frame, or between two consecutive sub-frames. The network node may handle the interference avoidance from the uplink transmissions to downlink transmissions of a subsequent sub-frame by controlling transmission timing advance parameters of terminal devices.

In another embodiment, the uplink part precedes the downlink part in the sub-frame.

In some embodiments, the dedicated guard interval 402 may be omitted. In other embodiments employing the guard interval, 402 the guard interval may be realized by discontinuous transmission or transmission of zeros or another artificial signal having no signalling or data content, for example.

In FIG. 4, the first sub-frame 408 comprises a downlink part 400 that is longer than the uplink part. As a consequence, the first sub-frame may be considered as a downlink sub-frame in the sense that it contains a longer downlink transmission time than an uplink transmission time. In the second sub-frame 418, the uplink part 404 is longer than the downlink part 400. As a consequence, the second sub-frame may be considered as an uplink sub-frame in the sense that it contains longer uplink transmission time than downlink transmission time. The third sub-frame 428 comprises a longer guard period 402 than in the first sub-frame and second sub-frame.

Figure 5:
Figure 5:
Figure 5:
Figure 5:

As described above in connection with FIGS. 2 and 3, either the uplink control part or the downlink control part or both control parts may have variable lengths determined by the network node. FIG. 5 illustrates some embodiments of frames with different lengths of the control parts. Referring to FIG. 5, let us first consider downlink sub-frames 508, 518. The downlink sub-frames 508, 518 may be considered as embodiments of the first sub-frame 408. The downlink sub-frames 508, 518 may be allocated with the same length of the uplink control part 506 and the guard interval 504. Accordingly, the length of the downlink control part and a downlink data part may be varied.

The downlink sub-frame 508 may be considered as a downlink sub-frame having a regular or default length of the downlink control part 500. The default length may be one-symbol duration, e.g. one orthogonal frequency-division multiplexing (OFDM) symbol duration. The downlink sub-frame 518 may be considered as a downlink sub-frame having an extended downlink control part 510 having a higher length than the downlink control part 500 of the sub-frame 508. Accordingly, the size of the downlink data part 512 may be reduced with respect to the downlink data part 502.

Let us then consider uplink sub-frames 528, 538. The uplink sub-frames 528, 538 may be considered as embodiments of the second sub-frame 418, for example. The uplink sub-frames 528, 538 may be allocated with the same length of the downlink control part 520 and the guard interval 522. Accordingly, the length of the uplink control part and an uplink data part may be varied.

The uplink sub-frame 528 may be considered as an uplink sub-frame having a regular or default length of the uplink control part 526. The default length may be e.g. one symbol duration, (such as one OFDM symbol duration). The uplink sub-frame 538 may be considered as an uplink sub-frame having an extended uplink control part 532 having a higher length than the uplink control part 526 of the sub-frame 528. Accordingly, the size of the uplink data part 530 may be reduced with respect to the uplink data part 524.

A further sub-frame may comprise the extended uplink control part and the extended downlink control part. Such a sub-frame may be an uplink sub-frame or a downlink sub-frame. An uplink sub-frame may comprise the uplink data part and no downlink data part, and a downlink sub-frame may comprise the downlink data part but no uplink data part.

The split between the control part and the data part of the same link direction in each sub-frame may be selected according to a determined criterion. One criterion may be to first assign necessary resources for the control part and the remaining resources are allocated to the data part.

In an embodiment, the network node may allocate a fixed set of available lengths for the uplink control part and/or the downlink control part in block 200. A different set of available lengths may be allocated to the uplink control part and the downlink control part. Accordingly, the ranges of possible lengths may be different for the uplink control part and the downlink control part. A symbol length employed in uplink and/or downlink communications and the number of symbols in the sub-frame may define the granularity for the length(s) of the control part(s). In a similar manner, the symbol lengths, the number of symbols in the sub-frame, and the number of symbols available for each part of the sub-frame may limit the set of available lengths for the uplink control part and/or the downlink control part.

In another embodiment, the network node may reallocate the set of available lengths for the uplink control part and/or the downlink control part. Accordingly, the ranges of possible lengths may also be variable. Accordingly, the network node may use a different set of available lengths for a control part of the same link direction in different sub-frames.

In the embodiments of FIGS. 4 and 5, the uplink and downlink parts may be equally considered as transmission and reception parts, respectively. The sub-frame structures may be employed in communication between two terminal devices or between two network nodes so the definition of the transmission and reception parts may be more appropriate in such applications.

Figure 6:
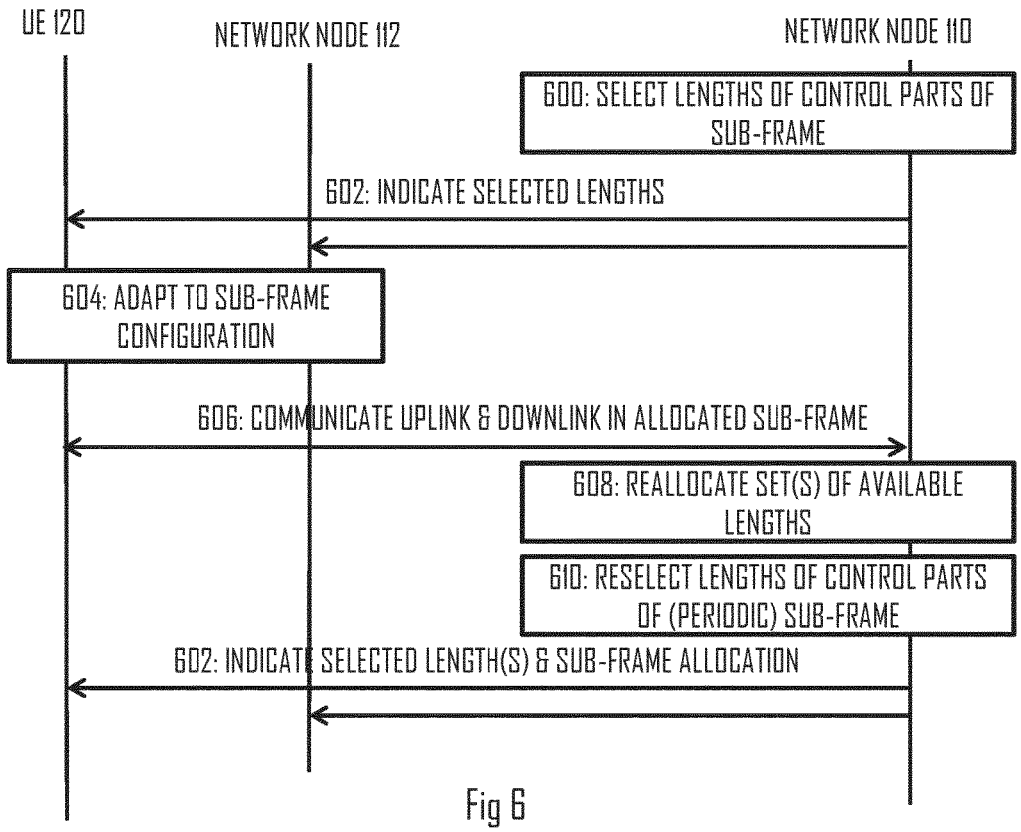
FIG. 6 illustrates a signaling diagram of a procedure for defining and signaling variable control part lengths in the sub-frames according to an embodiment of the invention.

Let us now describe an embodiment where the set(s) of available lengths are variable with reference to FIG. 6. FIG. 6 illustrates an embodiment where the lengths of both the uplink control part and the downlink control part may be selected from separate sets of available lengths, but the embodiment is equally applicable to a scenario where one of the control parts has a fixed length. Let us assume that the network node has already carried out block 200. In block 600, the network node 110 selects the lengths of the control parts of a sub-frame. The length of each control part may be selected amongst a plurality of available lengths.

In step 602, the network node transmits a control message indicating the selected length(s). The control message may be received by the terminal device 120 and, in some embodiments, another network node 112 operating a neighboring cell. The control message may be sent as a common control message, or it may be transmitted as a part of system information broadcast by the network node 110. The control message transmitted as the system information may be a higher layer message, e.g. layer 3 or a radio resource control layer. In some further embodiments, the control message may be transmitted to a specific recipient as a dedicated or unicast message. In this case, the control message may be a medium access layer (layer 2), a radio link control layer (layer 2), or even a physical layer (layer 1) control message. The common control message or the system information may be used in case the selection in block 600 is performed in a semi-static manner such that the selection applies to a plurality of sub-frames. The dedicated message may be used in case the selection in block 600 is dynamic.

Upon receiving the control message in step 602, the terminal device 120 may configure its receiver to perform reception during the downlink control part and/or to carry out transmission of uplink control information during the uplink control part. The received lengths of the control parts may determine for how long or at which timing the terminal device performs downlink reception and/or uplink transmission during the sub-frame (step 606).

Upon receiving the control message in step 602, the neighboring network node 112 may consider the allocation of the uplink/downlink control parts of the sub-frame in the allocation of the sub-frames provided by the network node 112. For example, the network node may align the uplink and/or downlink control parts of a sub-frame provided by the network node 112 simultaneously with the sub-frame provided by the network node 110. In other words, the network node 112 may select the same lengths for the uplink control part and the downlink control part as indicated in the received control message such that both network nodes 110, 112 provide simultaneously sub-frames having the same lengths and positions of the control parts. In more detail, this embodiment provides that simultaneously transmitted symbols will be transmitted in the same link direction in the neighboring cells. Such a solution reduces inter-cell interference.

In another embodiment, the network node 112 may take the lengths into account in another manner. For example, let us assume that the network node 112 provides a downlink data part that overlaps with an uplink control part of the sub-frame provided by the network node 110. Accordingly, the uplink transmissions in the cell 100 may cause interference to a terminal device receiving data from the network node 112 in the downlink data part. The network node 112 may take the interference into account by scheduling such a downlink data part to a terminal device that is not close to the cell edge or close to the cell 100. Additionally or alternatively, the network node may employ a stronger modulation and coding scheme for data transmitted in the downlink data part.

In general, the network node 112 may perform inter-cell interference coordination on the basis of the control message received in step 602, e.g. by configuring a sub-frame structure, allocating resources to terminal devices served by the network node, and/or adapting link adaptation parameters.

In block 608, the network node may reallocate the set of available lengths for one or both of the uplink control part and the downlink control part. The reason may be general need for more/less uplink/downlink control resources, increase/decrease of cell size, more/less terminal devices on the edge of the cell, traffic load, etc. When the set of available lengths is changed, the network node 110 may need to change the lengths of control parts of at least some of the sub-frames for which the control part length(s) have been selected in a semi-static manner. Additionally, the network node 110 may take the changed set(s) into account in the dynamic allocation of the lengths of the control parts in sub-frames. Accordingly, the network node reselects in block 610 the length of at least one of a downlink control part and an uplink control part of a sub-frame from the new set of available lengths determined in block 608. The reselection may be signaled in a control message as described above in connection with step 602.

In an embodiment, the network node 110 indicates the selected lengths to the terminal device(s) in the cell 100 and to the neighboring network nodes via separate control messages, e.g. through different interfaces. For example, the network node may indicate the selected lengths to the terminal devices in the cell 100 via radio or wireless messages and to the neighboring network nodes via wired or wireless messages.

Figure 7:
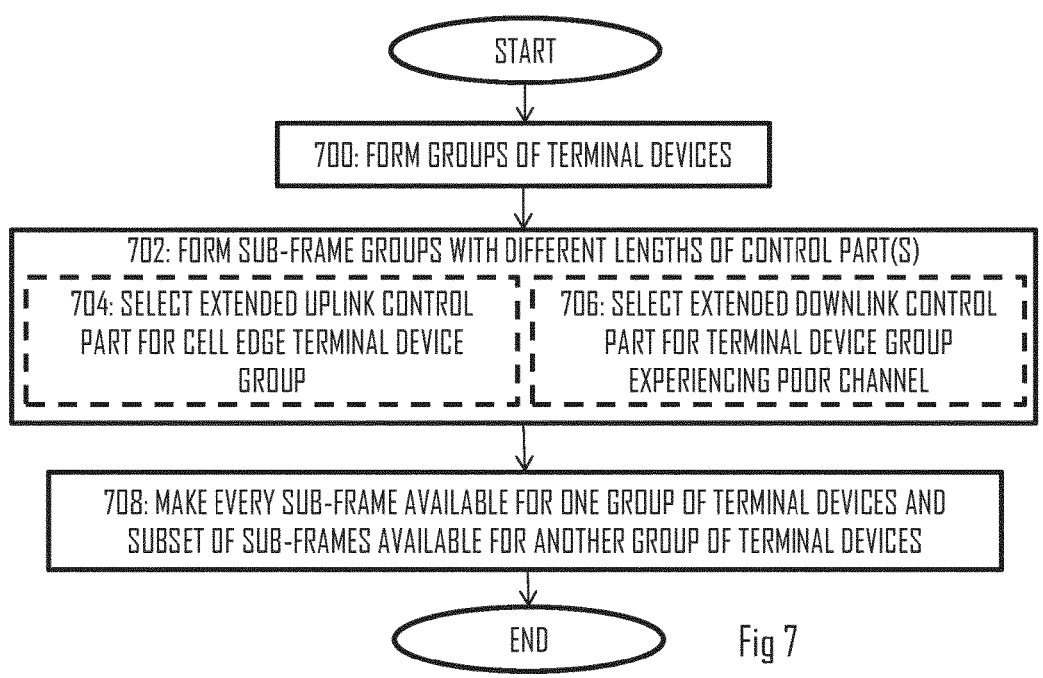
FIG. 7 illustrates some embodiments for performing grouping of terminal devices and/or sub-frames in the network node.

As mentioned above, the having the set of available lengths for the control parts enables flexible adaptation of various situations. This is particularly advantageous in a case where the cell 100 is a macro cell having a large coverage area, e.g. even tens to hundreds of square miles. In such a cell, different terminal devices experience different radio environments in the communication with the network node 110. In general, different terminal devices in the cell may need different amount of control signaling in the cell. FIG. 7 illustrates an embodiment where the network node forms a plurality of groups of terminal devices and assigns different lengths of the control part(s) of the sub-frame to different groups. Referring to FIG. 7, the network node forms the groups in block 700. The grouping may be carried out by assigning those terminal devices to the same group that have the same or similar requirement for uplink and/or downlink control signaling, in particular in terms of the amount of uplink and/or downlink control signaling.

In an embodiment of block 700, the network node 110 assigns terminal devices located on the edge of the cell 100 to one group and terminal devices located close to a radio site of the network node to another group. The network node may employ a certain criterion for determining whether or not a terminal device is located on a cell edge or close to the radio site, e.g. a similar method used for estimating an uplink timing advance for the terminal device.

In another embodiment of block 700, the network node 110 assigns terminal devices experiencing poor radio channel to one group and terminal devices located experiencing good radio channel to another group. The network node may employ a certain criterion for determining the quality of the radio channel, e.g. a signal-to-interference-power ratio (SIR or SINR). Other grouping criteria are equally possible.

In block 702, the network node 110 forms sub-frame groups with different configurations with respect to the lengths of the control parts. In an embodiment, the sub-frame groups are defined in block 702 by the sets of available lengths for the uplink and/or downlink part. Each sub-frame group may have a unique set of available lengths of the uplink control part and/or the downlink control part.

Block 704 illustrates an embodiment where a sub-frame group is provided with an extended uplink control part, e.g. the uplink sub-frame 538. This sub-frame group may define a plurality of different sub-frame configurations, each with a different length of the uplink control part and each uplink control part having an extended length with respect to the default length of the uplink control part. Such a sub-frame may be allocated to terminal devices located on the edge of the cell 100. Block 706 illustrates an embodiment where a sub-frame group is provided with an extended downlink control part, e.g. the downlink sub-frame 518. This sub-frame group may define a plurality of different sub-frame configurations, each with a different length of the downlink control part and each downlink control part having an extended length with respect to the default length of the downlink control part. Such a sub-frame may be allocated to terminal devices experiencing poor downlink channel. A further sub-frame group may be formed by the downlink sub-frame 508 having the default length of the downlink control part, and yet a further sub-frame group may be formed by the uplink sub-frame 528 having the default length of the uplink control part. In this manner, the network node may create an arbitrary number of sub-frame groups, each sub-frame group having a unique combination of the lengths of the uplink and downlink control parts.

In an embodiment, the network node may assign a shorter guard interval 402, 504, 522 to a sub-frame group having the default lengths of the control parts. In another embodiment, the network node may assign a shorter guard interval 402, 504, 522 to a sub-frame group designed for the terminal devices close to the radio site. Correspondingly, the network node may assign a longer guard interval to a sub-frame group having the extended lengths of the control parts. In another embodiment, the network node may assign the longer guard interval to a sub-frame group designed for the terminal devices on the cell edge.

In block 708, the network node allocates the sub-frame groups to the terminal devices. The allocation may be based on the groupings made in blocks 700 and 702. For example, the terminal devices located close to the radio site may have resource allocations in all sub-frames regardless of whether the sub-frames have default or extended lengths of the control parts. The reasoning may be that the terminal devices close to the radio site are capable of communicating with the network node with virtually any amount of uplink/downlink control signaling in the sub-frame. A minimum, non-zero length may be defined in the set of available lengths for each of the uplink control part and the downlink control part.

Further in block 708, the network node may allocate resources from certain sub-frame groups to only a subset of terminal device groups. For example, some terminal device groups may not be assigned with resources from a certain sub-frame group. A group of terminal devices needing a higher amount of uplink control signaling may be allocated with resources from a sub-frame group having the extended uplink control part. Similarly, a group of terminal devices needing a higher amount of downlink control signaling may be allocated with resources from a sub-frame group having the extended downlink control part.

In the embodiment where the network allocates to a first terminal device located close to the radio site sub-frames from a sub-frame group from which resources are allocated also to a second terminal device located on the cell edge, the network node may assign a plurality of different timing advance parameters to the first terminal device. The terminal device may employ one timing advance parameter in a sub-frame of a first sub-frame group and a different timing advance parameter in a sub-frame of a second sub-frame group. For example, a longer timing advance may be employed in a sub-frame from which resources are allocated to the second terminal device.

The embodiment using the terminal device grouping based on the distance to the radio site and allocation of resources from all sub-frame groups to a terminal device close to the radio site may enable low latencies for the terminal device. The reason is that the terminal device may be allocated with resources from all sub-frames while the cell edge terminal devices still benefit from the greater amount of control signaling. In an embodiment, the network node may define employ the grouping of block 700 in the scheduling of resources from the sub-frames, as described above. In another embodiment, the network node 110 employs the grouping of block 700 in defining a plurality of different timings for block acknowledgments of an automatic repeat request (ARQ) or a hybrid ARQ (HARQ) process. For example, let us take the first terminal device and the second terminal device mentioned in the previous paragraph. Further, let us assume that a first sub-frame group is for the second terminal device only and has, for example, the extended uplink control part, while a second sub-frame group has default lengths of the control parts. Now, the second terminal device may be allocated with resources from only the first sub-frame group. Accordingly, the network node may assign downlink data resources and corresponding uplink block acknowledgment only from sub-frames of the second sub-frame group. In embodiments where the block acknowledgment is transmitted in a different sub-frame than the sub-frame carrying the data acknowledge with the acknowledgment, the timing is limited by the presence of the sub-frames of the first sub-frame group. For example, in a situation where the sub-frames of the first sub-frame group are periodic, the periodicity may define the timing. Meanwhile, the first terminal device may be allocated with resources from both (or all) sub-frame groups. Accordingly, the first terminal device may be assigned an uplink block acknowledgment resource from the sub-frame subsequent to the sub-frame carrying the downlink data acknowledged with an acknowledgment in the uplink block acknowledgment resource. Accordingly, the second terminal device may benefit from low acknowledgment latency in the (H)ARQ process.

In an embodiment, any one of sub-frames 408, 418, 428, 508, 518 of FIGS. 4 and 5 may comprise a self-container. The self-container may be considered as a sub-frame carrying both data and an acknowledgment of the data. Referring to the sub-frame 408, for example, the downlink part 400 may carry downlink data to a terminal device and the uplink part 404 may carry a block acknowledgment indicating whether or not the terminal device received the downlink data correctly (ACK/NAK). In general, the self-container may be provided in sub-frames comprising a data part of one link direction and a subsequent control part of the opposite link direction.

In an embodiment, the network node may adjust the length(s) of the control part(s) for virtually any sub-frame type as long as the sub-frame comprises a control part carrying the control or management information and/or at least one reference signal sequence. FIGS. 4 and 5 illustrate some sub-frame types comprising the uplink part and the downlink part. Other sub-frame types may include a downlink-only sub-frame comprising only a downlink part. The downlink part may comprise the downlink control part and, in some embodiments, a downlink data part. Yet another sub-frame type may include an uplink-only sub-frame comprising only an uplink part. The uplink part may comprise the uplink control part and, in some embodiments, an uplink data part. The network node may employ any one or more of these sub-frame types, even all of them. This improves the flexibility by enabling the network node to adaptively select the sub-frame type.

Referring to the definition of the sub-frame, a communication protocol realized in the cell may employ radio frames, wherein each radio frame may comprise a determined number of sub-frames. For example, in the LTE-time-division-duplexing system, a radio frame may be a 10 millisecond (ms) frame and comprise ten sub-frames. Accordingly, each sub-frame may have a duration of 1 ms. It should be appreciated that another system may employ radio frames of different length and a different number of sub-frames.

Figure 8:
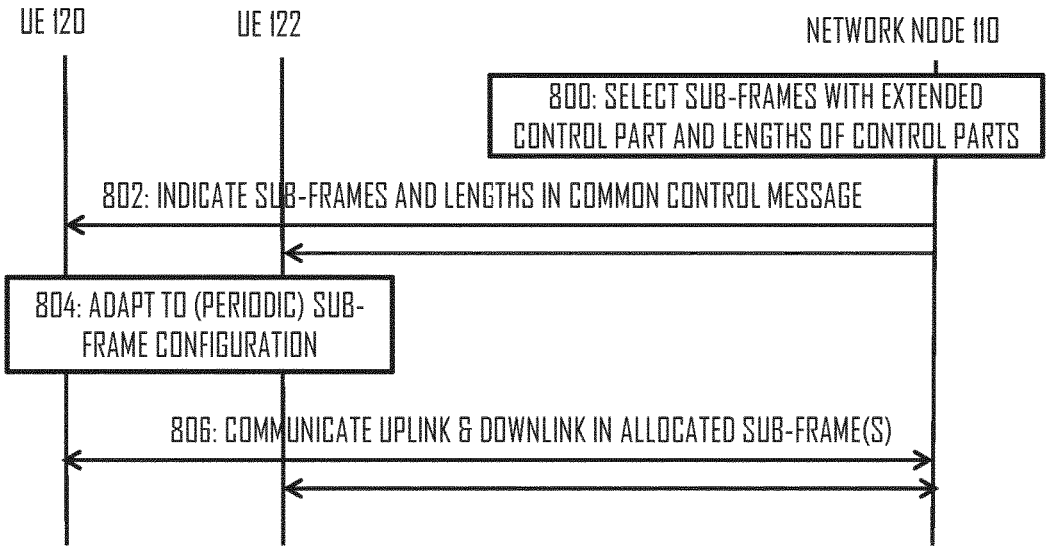
FIG. 8 illustrates an embodiment for indicating the lengths of the control parts in the sub-frames via common control signaling.

In an embodiment, the selected lengths of the control part(s) may be periodic such that every $N^{th}$ sub-frame has the selected length of the control part(s). Accordingly, the length may be a semi-static parameter. Such a semi-static parameter and timing of such periodic sub-frames may be signaled by the network node 110 via common control signaling and/or in system information. FIG. 8 illustrates an embodiment where common control signaling is used to indicate the lengths of the control parts of the sub-frames. Referring to FIG. 8, the network node selects in block 800 sub-frames having the extended control part—uplink and/or downlink—and selects the extended length(s) of the control part(s). At least one of the following criteria may cause the selection of the sub-frame with the extended control part(s) and the actual length(s) of the control part(s): cell size, general need for uplink and/or downlink control signaling and/or reference signals, radio environment in the cell 100, traffic load, traffic class(es) of data traffic in the cell, and multi-antenna communication strategy. For example, a larger cell size may cause the need for a greater number of sub-frames with the extended control part(s) and greater amount of control signaling and reference signals. A poor radio environment with many terminal devices may also cause the need for longer control part(s). More capacity for reference signals may be needed when the multi-antenna communication strategy is based on an assumption that the radio channel is reciprocal. Traffic load may cause various needs for the amount of control part capacity.

In an embodiment, the length(s) of the control part(s) is performed with the granularity of one (OFDM) symbol.

With respect to the extension of a control part, a default length of the control part may be one symbol or two symbols. The first extension may be carried out by adding one extra symbol. The extra symbol may be added periodically, e.g. to every fifth or every tenth sub-frame. The next level of extension may be carried out by increasing the periodicity of the sub-frame with the extended control part and/or by adding more symbols to the control part. This scheme may apply to the selection of the extended length of the uplink control part and/or the downlink control part. With respect to the uplink control part, one symbol may be sufficient when a payload size of uplink control information is low, e.g. less than ten bits per sub-frame. However, up to four symbols may be needed for the uplink control part when the payload size of the uplink control information exceeds the ten bits.

In step 802, the network node transmits or broadcasts a common control message indicating sub-frames having the extended control part and the length(s) of the control parts in the sub-frames. As the common control message is available to all terminal devices in the cell 100, terminal devices 120, 122 receive it in step 802 and store the sub-frame configuration. The terminal devices 120, 122 may also adapt in block 804 the transmission and reception timings to the sub-frame configuration indicated in step 802. The process in block 804 may be similar to the operation of the terminal device 120 in block 604. For example, if the sub-frames comprise periodically the extended downlink control part, the terminal devices 120, 122 may tune their receivers to extend the downlink reception in these sub-frames with the same periodicity. In step 806, the network node communicates with the terminal devices in the sub-frames according to the downlink and uplink timings indicated in the step 802.

In an embodiment, the network node indicates the semi-static sub-frame configurations with the common control message. In another embodiment, the network node indicates both semi-static and dynamic sub-frame configurations in the common control message. As an example of the dynamic sub-frame configuration, the first symbol of each sub-frame may be a downlink control part and comprise an information element indicating the lengths of the control parts of the sub-frame. The information element may be available to all terminal devices in the cell.

In the embodiment employing the common control messages, the sub-frame configurations may be carried out in a cell-specific manner. This may be understood such that the sub-frame configurations including the lengths of the control parts may be determined on the basis of general need for uplink and/or downlink control part capacity. In yet another embodiment, the network node may indicate the dynamic sub-frame configurations in a terminal-device-specific manner and indicates the dynamic sub-frame configuration in a dedicated control message addressed to the respective terminal device. For example, the network node may dedicate a given sub-frame to a single terminal device and select the lengths of the control parts according to the need for control signaling with the terminal device. Then, the network node may indicate the selected sub-frame configuration to the terminal device in a dedicated control message addressed only to the terminal device. The network node may also schedule the resources of the sub-frame to the terminal device.

In an embodiment, the network node may select that a sub-frame comprises periodically an extended uplink/downlink control part, and actual length of the uplink and/or downlink control parts may be signaled in a separate message. Accordingly, the terminal devices may be aware of, for example, the periodicity of the sub-frames having the extended control part(s). The actual lengths of the control parts in these sub-frames may be determined in the dynamic manner. In an embodiment, also the link direction of each sub-frame may be determined in the dynamic manner. Referring to FIGS. 2 and 5, the message transmitted in block 204 may indicate whether the sub-frame is an uplink sub-frame 528, 538 or a downlink sub-frame 508, 518 and the length of the downlink control part and the uplink control part of the sub-frame.

Let us consider some examples. Let us assume that a certain sub-frame has been semi-statically allocated to have an extended uplink control part. The network node may use the dynamic control to select the link direction. Upon selecting the sub-frame as the downlink sub-frame, the network node may use the default length of the downlink control part and select the length of the uplink control part from the set of available lengths for the uplink control part. The remaining duration in the length of the sub-frame is then left to the guard interval (if any) and to the downlink data part. Upon selecting the sub-frame as the uplink sub-frame, the network node may use the default length of the downlink control part and select the length of the uplink control part from the set of available lengths for the uplink control part. The remaining duration in the length of the sub-frame is then left to the guard interval (if any) and to the uplink data part.

As another example, let us assume that a certain sub-frame has been semi-statically allocated to have an extended downlink control part. The network node may use the dynamic control to select the link direction. Upon selecting the sub-frame as the downlink sub-frame, the network node may use the default length of the uplink control part and select the length of the downlink control part from the set of available lengths for the downlink control part. The remaining duration in the length of the sub-frame is then left to the guard interval (if any) and to the downlink data part. Upon selecting the sub-frame as the uplink sub-frame, the network node may use the default length of the uplink control part and select the length of the downlink control part from the set of available lengths for the downlink control part. The remaining duration in the length of the sub-frame is then left to the guard interval (if any) and to the uplink data part.

As yet another example, let us assume that a certain sub-frame has been semi-statically allocated to have an extended uplink control part and an extended downlink control part. The network node may use the dynamic control to select the link direction. Upon selecting the sub-frame as the downlink sub-frame, the network node may select the length of the uplink control part from the set of available lengths for the uplink control part and further select the length of the downlink control part from the set of available lengths for the downlink control part. The remaining duration in the length of the sub-frame is then left to the guard interval (if any) and to the downlink data part. Upon selecting the sub-frame as the uplink sub-frame, the network node may select the length of the uplink control part from the set of available lengths for the uplink control part and further select the length of the downlink control part from the set of available lengths for the downlink control part. The remaining duration in the length of the sub-frame is then left to the guard interval (if any) and to the uplink data part.

The dynamic control may be defined such that there is a dedicated control message for each sub-frame indicating the link direction and/or the lengths of the control parts of the sub-frame. The semi-static manner may be defined such that a single control message provides control information for a plurality of sub-frames.

Figure 9:
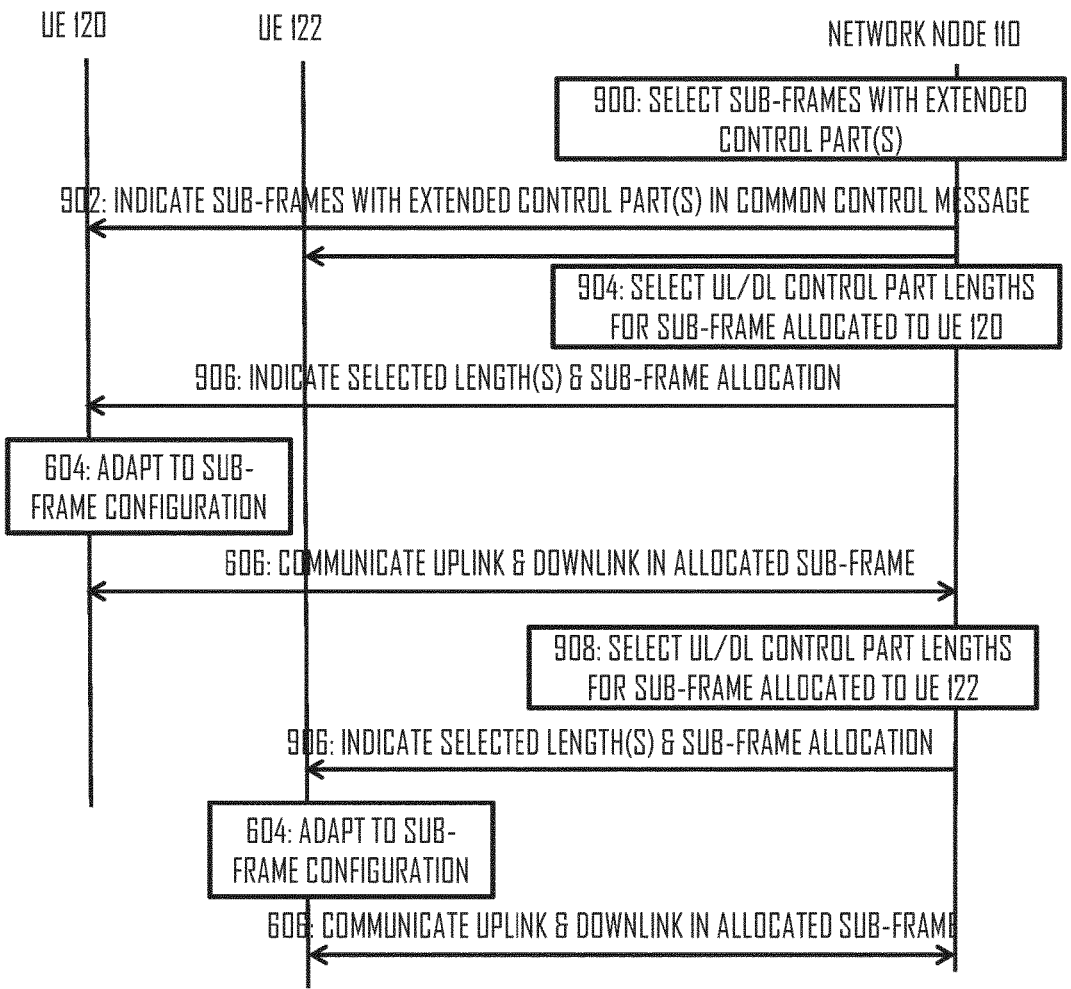
FIG. 9 illustrates an embodiment for indicating the lengths of the control parts in the sub-frames via dedicated control signaling.

FIG. 9 illustrates an embodiment where the lengths of the control parts are carried out in a terminal-device-specific manner and signaled in a dedicated control messages. In an embodiment, the network node may semi-statically assign certain sub-frames as available for extended control part(s) (block 900). Such sub-frames may be available periodically, for example. This assignment may or may not be signaled to the terminal devices. The signaling is carried out in step 902 so the terminal devices 120, 122 become aware of the presence of sub-frames having terminal-device-specific configurations with respect to the lengths of the control parts. However, in case step 902 is omitted, the network node may take the terminal-device-specific configuration into account in the allocation of resources to the data part of the sub-frame. The control part extension consumes the resources of the related data part so the network node may simply avoid allocating these data parts to other terminal devices.

The network node may then select a sub-frame to be allocated to the terminal device 120, wherein the link direction may be selected before the allocation of the sub-frame or after the allocation of the sub-frame. Upon selecting the sub-frame allocated to the terminal device 120, the network node may select the length(s) of the control part(s) of the sub-frame according to the need of the terminal device 120 for the control part capacity and indicate the selected length(s) and the sub-frame allocation to the terminal device in step 906. Upon receiving the sub-frame allocation and the lengths of the control parts in step 906, the terminal device may carry out block 604 described above. In step 606, the network node and the terminal device may carry out uplink and downlink communication in the sub-frame.

In a similar manner, the network node may allocate another sub-frame to the terminal device 122 (block 908) and select the lengths of the control parts according to the needs of the terminal device. Then, steps 906, 604, and 606 may be carried out between the terminal device 122 and the network node 110.

Figure 10:
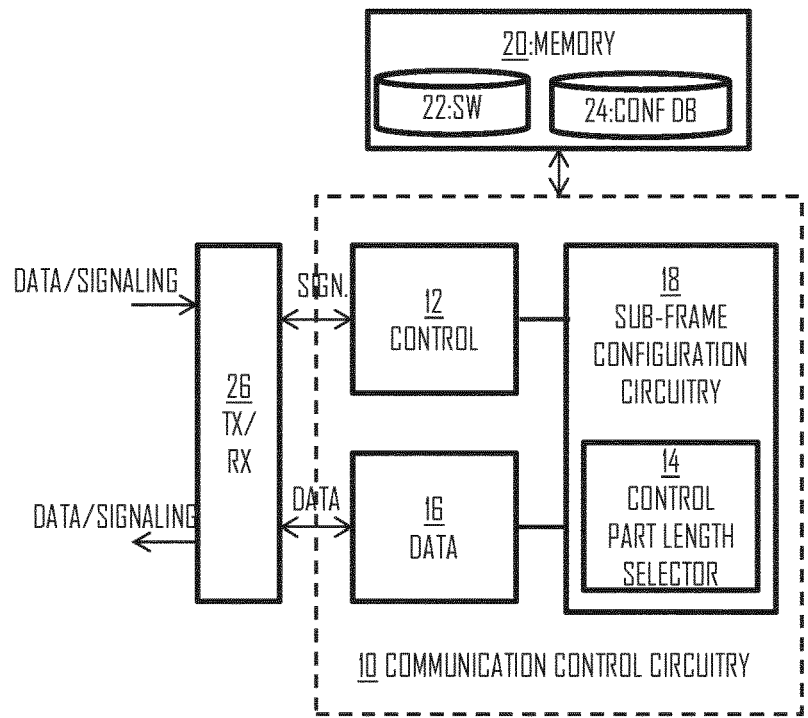
FIGS. 10 and 11 illustrate block diagrams of structures of apparatuses according to some embodiments of the invention.
Figure 11:
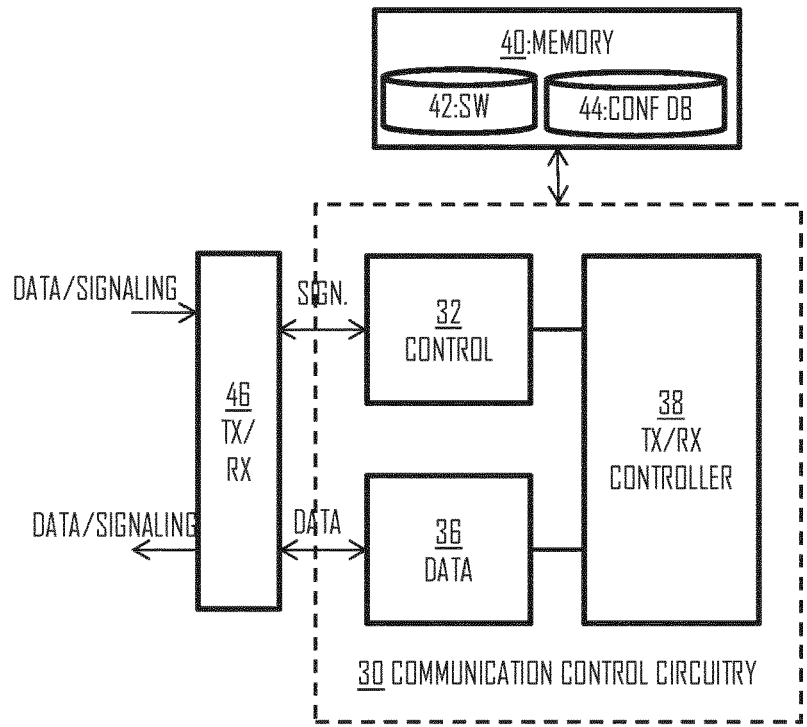

FIGS. 10 and 11 provide apparatuses according to some embodiments of the invention. FIG. 10 illustrates an apparatus configured to carry out the functions described above in connection with the network node 110. FIG. 11 illustrates an apparatus configured to carry out the functions described above in connection with the terminal device 120. Each apparatus may comprise a communication control circuitry 10, 30, such as at least one processor, and at least one memory 20, 40 including a computer program code (software) 22, 42 wherein the at least one memory and the computer program code (software) are configured, with the at least one processor, to cause the respective apparatus to carry out any one of the embodiments of each apparatus described above.

The memories 20, 40 may be implemented using any suitable data storage technology, such as semiconductor based memory devices, flash memory, magnetic memory devices and systems, optical memory devices and systems, fixed memory and removable memory. The memory may comprise a configuration database 24, 44 for storing configuration data for communicating in a cell over a radio interface. For example, the configuration databases 24, 44 may store radio frame configurations supported by each apparatus, e.g. the above-described sub-frame configurations and the lengths of the control parts in the sub-frames.

The apparatuses may further comprise a communication interface (TX/RX) 26, 46 comprising hardware and/or software for realizing communication connectivity according to one or more communication protocols. The communication interface may provide the apparatus with communication capabilities to communicate in the cellular communication system and enable communication the network node 110 and terminal device 120, for example. The communication interface 26, 46 may comprise standard well-known components such as an amplifier, filter, frequency-converter, (de)modulator, and encoder/decoder circuitries and one or more antennas. The communication interfaces 26, 46 may comprise radio interface components providing the network node 110 and the terminal device 120 with radio communication capability in the cell 100.

In an embodiment of FIG. 10, at least some of the functionalities of the network node 110 may be shared between two physically separate devices, forming one operational entity. Therefore, the apparatus may be seen to depict the operational entity comprising one or more physically separate devices for executing at least some of the described processes. Thus, the apparatus of FIG. 9, utilizing such a shared architecture, may comprise a remote control unit (RCU), such as a host computer or a server computer, operatively coupled (e.g. via a wireless or wired network) to a remote radio head (RRH) located in a base station site. In an embodiment, at least some of the described processes of the network node 110 may be performed by the RCU. In an embodiment, the execution of at least some of the described processes may be shared among the RRH and the RCU. In such a context, RCU may comprise the components illustrated in FIG. 10, and the communication interface 26 may provide the RCU with the connection to the RRH. The RRH may then comprise radio frequency signal processing circuitries and antennas, for example.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Referring to FIG. 10, the apparatus may comprise a control circuitry 12 carrying out control plane signalling with terminal devices, other access nodes of the radio access network, and with network nodes of the core network 130. The control circuitry 12 may carry out steps 204, 602, 606, 802, 806, 902, 906 in the network node 110.

The apparatus may further comprise a sub-frame configuration circuitry 18 configured to configure the structures of the sub-frames provided by the network node 110. The sub-frame configuration circuitry 18 may define the locations of the uplink part and the downlink part in the sub-frames and the locations of the uplink and downlink control parts in the sub-frames. The sub-frame configuration circuitry 18 may comprise, as a sub-circuitry, a control part length selector circuitry 14. This circuitry 14 may carry out the selection of the lengths of the downlink control parts and/or uplink control parts in the sub-frames according to the above-described embodiments. The circuitry 14 may also define the sets of available lengths for the control parts. The circuitry 14 may, for example, carry out steps 200, 202, 600, 608, 610, 702, 800, 900, 904, 908. The circuitry 14 may then control the control circuitry 12 to carry out corresponding signalling to indicate the sub-frame configurations in the cell and/or to the neighbouring cells.

For the execution of block 700, the apparatus may comprise a terminal device grouping circuitry configured to group the terminal devices into groups on the basis of similar characteristics with respect to the need for uplink and/or downlink control signalling.

For the execution of block 708, the apparatus may comprise a scheduling circuitry configured to schedule resources of the sub-frames to the terminal devices.

The apparatus may further comprise a data communication circuitry 16 configured to carry out transmission and reception of payload data. The data communication circuitry 16 may receive, for each sub-frame in which the apparatus has scheduled resources of the data part to one or more terminal devices, an indication of the scheduled resources and a link direction of the scheduled resources. The data communication circuitry 16 may then carry out transmission or reception of data with the terminal devices in the data parts of the sub-frames.

Referring to FIG. 11, the apparatus may comprise a control circuitry 32 carrying out control plane signalling with one or more network nodes of the cellular communication system, e.g. the network node 110. The control circuitry 32 may also carry out cell search procedures. The control circuitry 32 may carry out steps 300, 302, 602, 606, 802, 806, 902, 906 in the terminal device 120.

The apparatus may further comprise a transmission controller circuitry 38 configured to control the transmission and reception timings of the terminal device 120. The transmission controller circuitry may carry out blocks 604 and 804, for example. In other words, the transmission controller circuitry may adapt the transmission and reception timings of the terminal device 120 to the lengths of the uplink control part and downlink control part in the sub-frames. The adaptation may be carried out on the basis of the signalling information received from the network node through the control circuitry 32 in steps 300, 302, 602, 802, 902, 906.

The apparatus may further comprise a data communication circuitry 16 configured to carry out transmission and reception of payload data. The data communication circuitry 36 may receive, for each sub-frame in which the apparatus has scheduled resources of the data part, an indication of the scheduled resources and a link direction of the scheduled resource. The data communication circuitry 16 may then carry out transmission or reception in the scheduled resources.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies)

that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 9 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 9 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
allocating, in a network node of a cellular communication system, at least one set of available lengths for use in selection of a length of at least one of an uplink control part and a downlink control part of a sub-frame;
selecting, in the network node, a length of at least one of the uplink control part and the downlink control part of the sub-frame, the length being selected amongst the at least one set of available lengths, the sub-frame comprising the uplink control part carrying at least one of uplink control information and an uplink reference signal and further comprising the downlink control part carrying at least one of downlink control information and a downlink reference signal; and
causing transmission of a message comprising at least one information element indicating the selected length of the at least one of uplink control part and downlink control part of the sub-frame.

2. The method of claim 1, said selecting comprising in the network node:
selecting the length of the uplink control part amongst a first set of the at least one set of available lengths for the uplink part;
selecting the length of the downlink control part amongst a second set of the at least one set of available lengths for the downlink part,
wherein the at least one information element comprised in the message indicates the selected length of the uplink control part and the selected length of the downlink control part of the sub-frame.

3. The method of claim 1, further comprising allocating a different set of available lengths for the uplink control part and the downlink control part.

4. The method of claim 1, wherein the selection is performed according to one or both of the following selection principles:
in a terminal-device-specific manner for a terminal device, and wherein the message is transmitted as a dedicated message to the terminal device;
in a cell-specific manner for a cell controlled by the network node, and wherein the message is transmitted as a common control message available to a plurality of terminal devices in the cell.

5. An apparatus comprising:
at least one processor, and
at least one memory comprising a computer program code, wherein the processor, the memory, and the computer program code are configured to cause the apparatus to:
acquire a first message originated from a network node of a cellular communication system, the first message comprising at least one information element indicating a first length of an uplink control part or a downlink control part of a first subframe, wherein the first sub-frame comprises the uplink control part and the downlink control part of the first sub-frame; and
acquire a second message originated from the network node, the second message comprising at least one information element indicating a second length of an uplink control part or a downlink control part of a second sub-frame, wherein the second sub-frame comprises the uplink control part and the downlink control part of the second sub-frame,
wherein the first length indicates the length of the control part of the same link direction as indicated by the second length, and wherein the second length is different from the first length.

6. The apparatus of claim 5, wherein the first message comprises a first information element indicating the length of the uplink control part of the first sub-frame and further comprises a second information element indicating the length of the downlink control part of the first sub-frame, and wherein the second message comprises a third information element indicating the length of the uplink control part of the second sub-frame and further comprises a fourth information element indicating the length of the downlink control part of the second sub-frame, wherein the first information element has a different value than the third information element and/or the second information element has a different value than the fourth information element.

7. The apparatus of claim 5, wherein the processor, the memory, and the computer program code are configured to cause the apparatus to:
transfer at least one control signal with the network node in at least one of the uplink control part and the downlink control part of the first sub-frame within a duration specified by the at least one information element comprised in the first message; and
transfer at least one control signal with the network node in at least one of the uplink control part and the downlink control part of the second sub-frame within a duration specified by the at least one information element comprised in the second message.

8. The apparatus of claim 5, wherein the first message is received as a dedicated control message addressed to the apparatus, and wherein the first length of the first sub-frame is terminal-device-specific in a cell controlled by the network node.

9. The apparatus of claim 5, wherein the second message is received as a common control message, and wherein the second length of the second sub-frame is cell-specific and applied to a terminal device comprising the apparatus and to other terminal devices in a cell controlled by the network node.

10. A method comprising:
acquiring, in a terminal device of a cellular communication system, a first message originated from a network node of the cellular communication system, the first message comprising at least one information element indicating a first length of an uplink control part or a downlink control part of a first sub-frame, wherein the first sub-frame comprises the uplink control part and the downlink control part of the first sub-frame; and
acquiring, in the terminal device, a second message originated from the network node, the second message comprising at least one information element indicating a second length of an uplink control part or a downlink control part of a second sub-frame, wherein the second sub-frame comprises the uplink control part and the downlink control part of the second sub-frame,
wherein the first length indicates the length of the control part of the same link direction as indicated by the second length, and wherein the second length is different from the first length.

11. The method of claim 10, wherein the first message is received as a dedicated control message addressed to the terminal device, and wherein the first length of the first sub-frame is terminal-device-specific in a cell controlled by the network node.

12. The method of claim 10, wherein the second message is received as a common control message, and wherein the second length of the second sub-frame is cell-specific and applied to the terminal device and other terminal devices in a cell controlled by the network node.

13. The method of claim 10, wherein the first control message comprises a first information element indicating the length of the uplink control part of the first sub-frame and further comprises a second information element indicating the length of the downlink control part of the first sub-frame, and wherein the second control message comprises a third information element indicating the length of the uplink control part of the second sub-frame and further comprises a fourth information element indicating the length of the downlink control part of the second sub-frame, wherein the first information element has a different value than the third information element and/or the second information element has a different value than the fourth information element.

14. The method of claim 10, further comprising:
transferring at least one control signal with the network node in at least one of the uplink control part and the downlink control part of the first sub-frame within a duration specified by the at least one information element comprised in the first message; and
transferring at least one control signal with the network node in at least one of the uplink control part and the downlink control part of the second sub-frame within a duration specified by the at least one information element comprised in the second message.

15. An apparatus comprising:
at least one processor, and
at least one memory comprising a computer program code, wherein the processor, the memory, and the computer program code are configured to cause the apparatus to:
allocate at least one set of available lengths for use in selection of a length of at least one of an uplink control part and a downlink control part of a sub-frame;
select a length of at least one of the uplink control part and the downlink control part of the sub-frame, the length being selected amongst the at least one set of available lengths, the sub-frame comprising the uplink control part carrying at least one of uplink control information and an uplink reference signal and further comprising the downlink control part carrying at least one of downlink control information and a downlink reference signal; and cause transmission of a message comprising at least one information element indicating the selected length of the at least one of uplink control part and downlink control part of the sub-frame.

16. The apparatus of claim 15, wherein the processor, the memory, and the computer program code are configured to cause the apparatus to carry out said selection by performing at least:

select the length of the uplink control part amongst a first set of the at least one set of available lengths for the uplink part;

select the length of the downlink control part amongst a second set of the at least one set of available lengths for the downlink part, wherein the at least one information element comprised in the message indicates the selected length of the uplink control part and the selected length of the downlink control part of the sub-frame.

17. The apparatus of claim 15, wherein the processor, the memory, and the computer program code are configured to cause the apparatus to allocate a different set of available lengths for the uplink control part and the downlink control part.

18. The apparatus of claim 15, wherein the processor, the memory, and the computer program code are configured to cause the apparatus to carry out the selection according to one or both of the following selection principles:

in a terminal-device-specific manner for a terminal device, and wherein the message is transmitted as a dedicated message to the terminal device;

in a cell-specific manner for a cell controlled by the network node, and wherein the message is transmitted as a common control message available to a plurality of terminal devices in the cell.

* * * * *